INVENTOR
CARL O. PINGRY, III
BY Karl A. Ohralik
ATTORNEY

June 29, 1965 C. O. PINGRY III 3,192,515

MAGNETIC INFORMATION RECORDING AND REPRODUCTION WITHOUT PRECISE SYNCHRONIZATION REQUIREMENTS

Filed March 29, 1962 3 Sheets-Sheet 3

United States Patent Office 3,192,515

Patented June 29, 1965

3,192,515

MAGNETIC INFORMATION RECORDING AND REPRODUCTION WITHOUT PRECISE SYNCHRONIZATION REQUIREMENTS

Carl O. Pingry III, Lexington, Ky., assignor to International Business Machines Corporation, New York, N.Y., a corporation of New York Filed Mar. 29, 1962, Ser. No. 183,654
10 Claims. (Cl. 340—174.1)

This invention relates to magnetic recording of information on a magnetizable medium in response to electrical signals representative of coded information and reciprocally, to reproduction of electrical signals representative of information magnetically recorded on a magnetizable medium.

Systems using magnetizable tapes on which information may be recorded and from which this information may be reproduced, are known. In these systems, each of the alphanumeric characters of information are represented by a certain combination of binary bits, either "zero" or "one." Bits representing each character are recorded at spaced locations in separate rows extending transversely of the tape. For recording and reproducing the information, a magnetic transducer head having non-magnetic gaps and respective recording and reproducing windings associated therewith, is used. Thus, for recording of information on the tape or reading information from it, the tape is moved longitudinally in discrete, one row increments, and during its stationary periods between movements, the magnetic head is swept rapidly across the tape with the head gaps in close proximity to the tape. For recording each binary "one" bit in each combination of bits representing an alphanumeric character, while the head is moved across the tape, the recording winding of the magnetic head is pulsed, that is, energized momentarily by current in one direction at certain transverse positions and is energized by current in a reverse direction for each binary "zero" bit. Ideally, the bits are recorded in prescribed areas as wide as the magnetic head recording width and at certain widths transversely of the tape. In a reading operation, the previously recorded magnetized areas of the magnetizable tape representing binary "one" bits are effective in inducing signal potentials in the reading winding of the head as it is moved across this area. Each of these signal potentials together with another one of a group of timing pulses, is applied in coincidence to an AND circuit for producing an output.

In the prior systems of the type described, during recording and reproducing operations it has been necessary to precisely synchronize the movement of the magnetic head with the electrical gating and driver circuits so as to record binary "one" bits at precise locations transversely of the tape. Failure to precisely record such bits, could likely result in an erroneous reading operation. For example, recording a "one" bit too soon or too late during the sweep of the magnetic head, would result in misplacing the magnetized area representing the binary "one" bit so that in a following reading operation, this bit would read at a time corresponding to the wrong timing pulse or at a time when no timing pulse occurs.

Thus, for proper operation in recording and in reading of information in the prior systems, the electronic circuits must be very accurately synchronized with head movement so as to be effective and receptive at the exact instant that the head is at the location of the recorded bit on the tape. A very slight misalignment of the magnetic tape, a slight misalignment of the magnetic head as may result from ordinary wear, or other slight discrepancies, will result in the improper positioning of the head relative to the tape for recording and/or reading of bits of information. The exact synchronization of the head movement with the electronic circuits required for recording and reading and the exact disposition of the tape is a critical problem.

For minimizing the precise synchronization required, it has been proposed to widen the magnetized area of bit recording on the magnetizable tape. However, this results in slight net improvement, if any at all, because wider magnetized areas become ill-defined, particularly along edges and the reading head may be unresponsive to the bits so recorded.

In these systems, printing machines of the type which are effective to produce unique combinations of concurrent electrical pulses in response to the printing of any alphanumeric character, or conversely, which are responsive to unique combinations of concurrent electrical pulses to print alphanumeric characters, serve as input and output apparatus at respective stations of the system. The input/output apparatus requires a parallel input of information bits and produces parallel output bits. Since the magnetic tape machine records and reproduces bits as the head sweeps across the tape, it is clearly a serial apparatus. Accordingly, special provision for serializing parallel information and deserializing serial information is required for compatibility between the tape machine and the input/output apparatus.

It is accordingly a principal object of this invention to facilitate accurate and reliable recording of information on a magnetizable medium and the subsequent reproduction of information therefrom without requirements of precise synchronization as heretofore required.

It is another object of this invention to effect the serialization of parallel input information and the deserialization of serial input information.

It is another object of this invention to facilitate accurate and reliable reading of information magnetically recorded on a magnetizable medium in traditionally narrow magnetized areas representing binary "one."

It is another object of this invention to provide the effective, efficient and economical transformation of parallel data to serial data and vice versa by apparatus serving to accomplish both transformations.

In accordance with this invention, in systems of the type described hereinabove, provision is made for moving a magnetic reading head generally in synchronism with means for producing a series of timing pulses. More particularly, the timing pulses are produced at times when the magnetic reading head is located between adjacent bit areas of any character recorded on the tape. Thus, in time relationship, the timing bits and bits read from the tape appear alternately. In accordance with a feature of this invention, a bistable trigger circuit is effective in storing the bit information from the magnetic head to assure the presentation of the same at the occurrence of the next occurring timing pulse so that other circuitry may be energized appropriately. Additionally, the trailing edge of the timing pulse is effective to condition the bistable trigger to be receptive to the next binary bit.

Consequently, the recorded magnetized bit on the tape may appear anywhere in a relatively large width on the tape corresponding to the time between timing pulses since the bistable trigger stores such an input, the only requirement being that sufficient spacing be provided between allowable recording areas of adjacent bits of the same character that such bits may readily be discerned.

The foregoing and other objects, features and advantages of the invention will be apparent from the following more particular description of preferred embodiments of the invention, as illustrated in the accompanying drawings.

Figure 1:
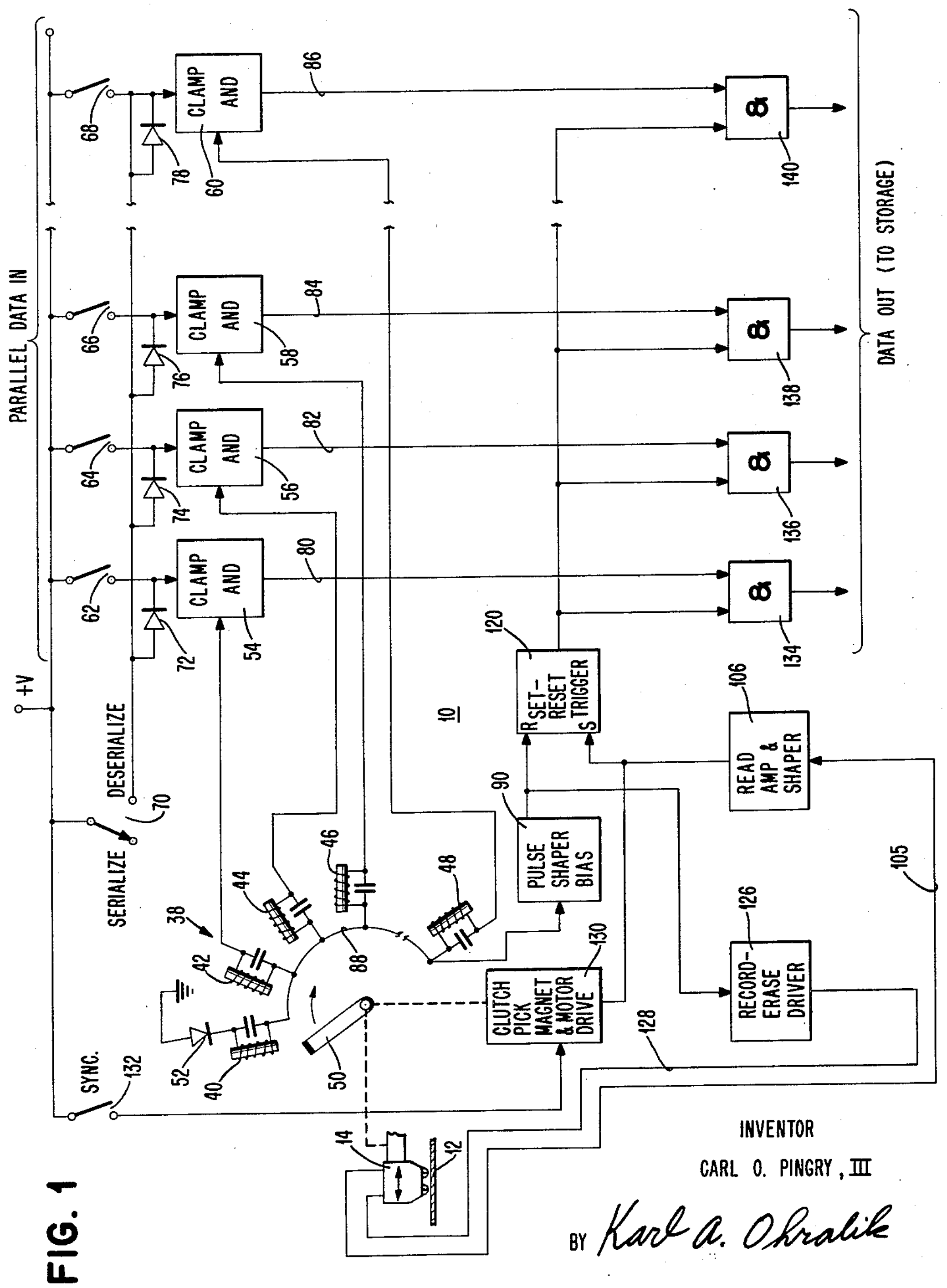
FIGURE 1 is a schematic block diagram of the essential components of the circuit of the invention, as utilized in conjunction with a magnetizable tape.
Figure 2:
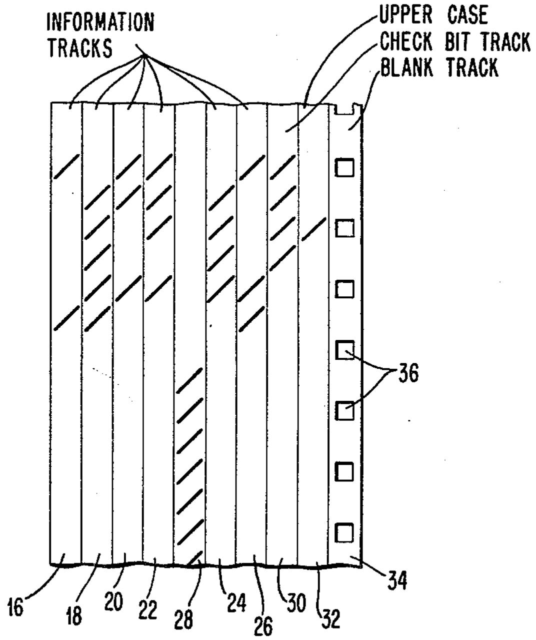
FIGURE 2 shows a portion of a magnetizable tape used in the system of FIGURE 1.

Referring now to the drawings for a detailed description of the invention, in FIGURE 1, 10 represents generally the recording and reproducing system incorporating the present invention. A magnetizable tape 12 shown in cross-section in FIGURE 1 and in greater detail in FIGURE 2 is provided as the medium on which information is recorded and from which it is reproduced. Cooperative with the tape 12 for recording and reproducing information is a known type of magnetic head transducer 14 which is reciprocable transversely of the tape as indicated by the two headed arrow. In recording alphanumeric characters, each character is represented by a different combination of binary bits, "ones" and "zeros," recorded along adjacent rows extending transversely of the tape. Typical rows of such recorded bits are shown in FIGURE 2, it being understood that the markings on the tape, representing magnetized "one" bit areas are only for purposes of description and explanation herein and that, in reality, magnetized portions on a tape are not visibly distinguishable from unmagnetized portions.

The electronic circuits for energizing the recording winding of the magnetic head are timed with the transverse movement of the head so that corresponding numbered bits of the different characters, from left to right in FIGURE 2, are disposed in longitudinal alignment along the tape. Since different combinations of six binary bits can represent the letters of the alphabet ten numbers and certain special functions such as, punctuation, tab, carriage return and backspace, longitudinal rows 16, 18, 20, 22, 24, and 26 accommodate the alphanumeric characters. The longitudinal row 28 has bits useful for positioning the tape, longitudinal row 30 is reserved for check or parity bits and longitudinal row 32 is reserved for bits representing upper case characters. A blank longitudinal row 34 is provided with suitable sprocket holes 36 for engagement with a sprocket, not shown, for advancing the tape in one row increments for recording and reading by the magnetic head 14.

The tape 12 is advanced longitudinally in one row increments by a power mechanism, not shown, and in the periods of time between advances, the head 14 is swept transversely of the tape with its reading and recording gaps in close proximity to the tape.

A magnetic commutator apparatus designated generally at 38 includes a plurality of inductive windings such as 40, 42, 44, 46 and 48 each having a soft iron core. Each winding is provided with a capacitor connected thereacross. An armature 50 made of permanent magnet material is rotatable at a constant speed in a direction as indicated by the arrow so as to pass by each of the cores of the mentioned windings and in doing so, induces electrical potentials in these windings. The first winding 40 has one end connected through a diode 52 to ground with the anode of the electrode of the diode being grounded. Cooperative with each of the other solenoids are respective clamp-AND circuits such as 54, 56, 58, and 60. It should be understood that as many respective windings and clamp-AND circuits are provided as there are binary bts along each transverse row on tape 12, a lesser number being shown only for simplicity. Each of the clamp-AND circuits is of a construction as disclosed in applicant's copending application for Logic AND/OR Gate Having Magnetically Induced Pulses As One Input, Serial No. 61,499, filed October 10, 1960; now Patent 3,087,076 and assigned to the present assignee. Accordingly, each of the clamp-AND circuits may be conditioned by potentials applied by the closure of corresponding switches 62, 64, 66, 68, interconnecting a potential source designated, +V, and the conditioning means of the respective clamp-AND circuits. These input switches are selectively closable, as for example, by coded contacts of a printer or typewriter. Alternatively, all of the clamp-AND circuits may be simultaneously conditioned selectively by a switch 70 closable to apply potential +V to all of the clamp-AND circuits through respective diodes 72, 74, 76, and 78. These diodes provide isolation between clamp-AND circuit inputs under selective closure of switches 62, 64, 66, and 68 with switch 70 open.

In a manner discussed in the above mentioned copending application, the passage of armature 50 past windings connected to clamp-AND circuits which are conditioned by closure of appropriate ones of switches 62 through 68, is effective to produce output potentials at both respective ones of the output lines 80, 82, 84, and 86 of such conditioned clamp-AND circuits and along a common line 88 interconnecting all of the remote ends of the windings. These pulses are applied to a pulse shaper-bias circuit 90 of a suitable type which produces pulses as shown at 91, 92, 94, 96, 98, 100, 102, and 104 in FIGURE 3 of the drawings. As the magnet 50 rotates past each winding, a pulse is produced at each of its ends. Clearly, pulses are sequentially applied to the clamp-AND circuits and a corresponding series of pulses is produced on line 88, one in time coincidence with each pulse applied to the clamp-AND circuits. The output of pulse shaper and bias circuit 90 is applied to the reset input terminal of a bistable, set-reset trigger 120.

The reproducing winding of the magnetic head 14 is connected through a line 105 to a read amplifier and pulse shaper amplifier circuit 106 of any suitable type. This circuit is responsive to pulses from the reproduce winding of head 14 to produce pulses of the type shown at 108, 110, 112, 114, and 116 in FIGURE 3 and applied to the set input terminal of set-reset trigger circuit 120.

The set-reset trigger 120 is a circuit with two states of stable equilibrium and is responsive to pulses of predetermined polarity applied to respective of its two inputs to change states only if the circuit was previously in a certain one of its states. That is, proper pulses at the set input are effective to change the circuit to its set state if it was previously reset and proper pulses at its reset input are effective to reset the trigger if it was previously set. The circuit remains in a set or reset condition in response to pulses applied to respective set or reset inputs. In its different states, potentials at its output are different, herein referred to as logical "one" in its set state and logical "zero" in its reset states.

A clutch pick magnet and motor drive circuit 130 is provided for rotating armature 50 and is responsive to pulses applied to either one of its two inputs to engage a clutch, not shown, to transmit power from a source, also not shown, to initiate and maintain rotation of armature 50 at substantially constant speed for one revolution. One input of circuit 130 is connected to a switch 132 which is selectively closable to apply the potential, +V, to this input and the other input is connected to the output of read amplifier and shaper circuit 106. The closure of switch 132 is effected by means, not shown, each time a group of the switches 62 through 68 is closed to represent a single character input.

Figure 3:
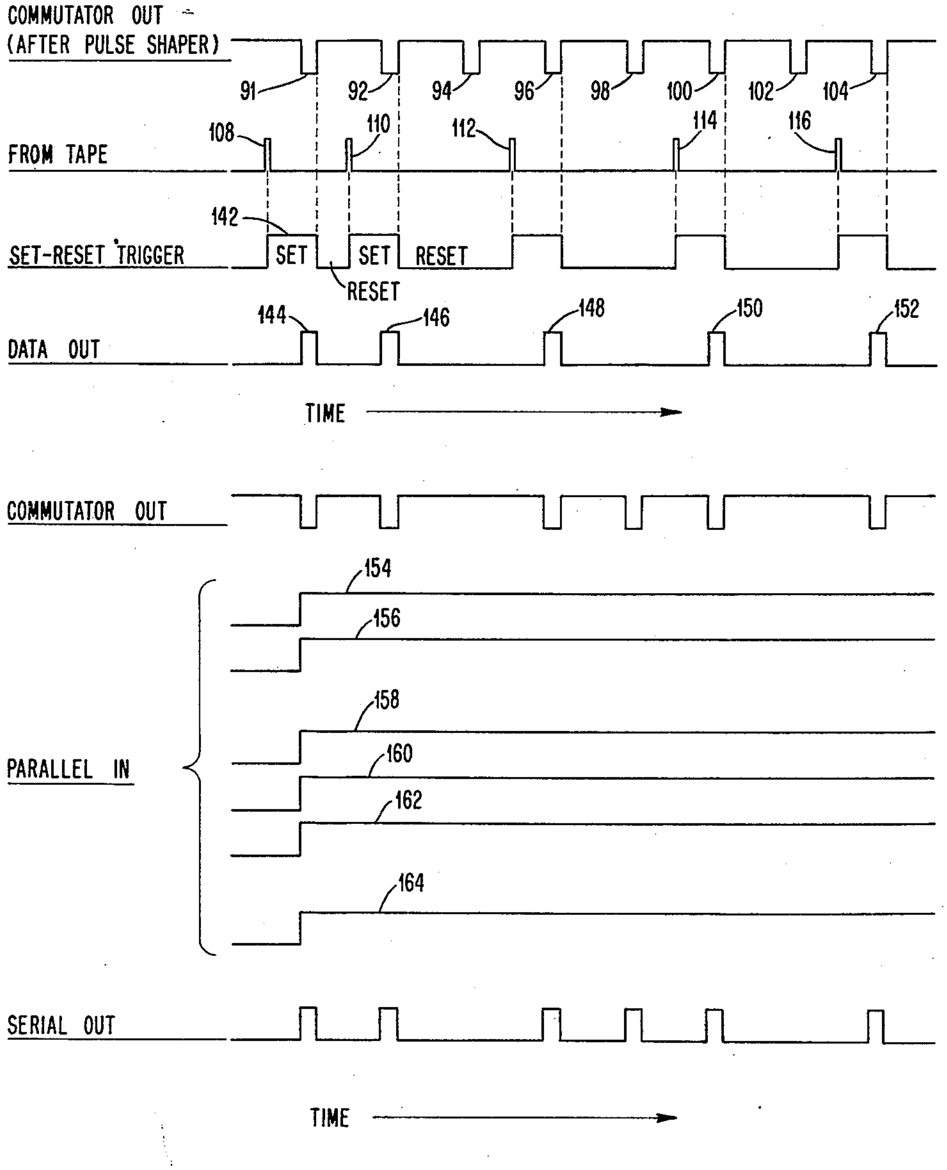
FIGURE 3 illustrates waveforms of potentials appearing at certain nodes in the circuit of FIGURE 1.

In the operation of the system 10, the mechanical linkages involved are interrelated so that the reading gap of the head 14, as it is swept across the tape 12, is in a position to read each information bit at a time when the armature 50 is between pairs of the windings of the commutator 38. The relative timing of pulses produced by the respective circuits is shown in FIGURE 3 wherein, the "one" bit pulses 108–116 from the magnetic head and circuit 106 occur at times between the times of pulses, from the commutator 38. Thus, in a reading operation of the system 10, these respective groups of pulses are not in time coincidence but rather are effectively offset in time with respect to each other. Each pulse produced by the commutator is effective through circuit 90 to reset the trigger 120 if it had been previously set and each pulse produced by the magnetic head 14 responsive to the reading of binary "one" is effective through circuit 106 to set the set-reset trigger 120. As shown in FIGURE 3, the trailing edge of the commutator pulses 91–104 resets the trigger 120. Winding 40 is effective in each cycle to produce a pulse initially resetting trigger 120 so as to assure that the trigger is receptive to the first incoming pulse from the magnetic head.

As seen in FIGURE 3, pulse 108 sets trigger 120 to produce an output pulse 142 and the positive going trailing edge of timing pulse 91, resets the trigger whereby its output potential drops. Similarly, each pulse of the group 110–116 sets the trigger to increase its output potential and the next timing pulse resets the trigger to decrease its output. It should be noted that the absence of a setting pulse followed by a resetting pulse merely produces a zero level of output potential from the set-reset trigger.

The occurrence of a pulse at the output of a clamp-AND circuit in coincidence with a set condition of the set-reset trigger, produces an output from a corresponding one of the AND circuits 134, 136, 138, and 140 since both of its inputs are conditioned.

In a manner described, the clamp-AND circuits are responsive to the commutator timing pulses to sequentially produce pulses along their output lines 80–86 and depending upon whether the magnetic head has previously read a "1" or "0," the set-reset trigger may be set to produce a pulse to an AND circuit 134, 136, 138, or 140 which is coincident with a pulse from a clamp-AND circuit 54, 56, 58, or 60 or the set-reset trigger 120 may be reset whereby no such output is produced by the set-reset trigger. Pulses 144, 146, 148, 150, and 152 are sequentially produced at the outputs of AND circuits such as 134–140 in the manner described. Reference is also made to FIGURE 3 which is helpful in showing the timing sequence in which data is read out and the set-reset trigger is reset.

A suitable storage means may be provided for storing the output pulses from AND circuits 134–140 for subsequent parallel presentation.

It is noted that according to this invention, for proper reproduction of the information recorded on the tape 12, it is only necessary that the serially produced input pulses, such as 108–118, be such that each appears in time between a pair of commutator output pulses. It is clear that these input pulses need only set the trigger any time previous to the next commutator pulse which is then effective to produce an output representative of such input pulses. According to this feature, since the set-reset trigger effectively stores the information from the tape until the resetting pulse is applied, considerable latitude is facilitated in the disposition of bits recorded on the tape 12 and precise synchronization between the head movement and other parts of the system are obviated.

For recording information on the tape 12 parallel data is received by the selective closure of certain combinations of the switches 62–68. Typical potentials resulting from such closure are shown at 154, 156, 158, 160, 162, and 164 in FIGURE 3. These potentials condition corresponding clamp-AND circuits 54, 56, 58, and 60 as described. With each character received, switch 132 is also closed to energize circuit 130. Armature 50 passes by all of the windings. The windings corresponding to the clamp-AND circuits which are conditioned by closed switches, produce output pulses along line 88. These pulses thus are a serial representation of the parallel data applied as an input by the input machine.

One output connection from pulse shaper and bias circuit 90 is applied to a record-erase driver 126 of a known type. The record-erase driver 126 is responsive to each successive input pulse applied to its single input, to produce an output recording pulse to the recording winding of the magnetic head. These pulses are effective to momentarily energize the recording winding of the head 14, to which it is connected in a reverse direction from its nonrecording energization, in response to each pulse applied to its input. The mechanism for moving head 14 across the tape 12 during a recording operation is linked to the arm 50 so as to write the binary "one" bits in appropriate locations on the tape as shown in FIGURE 2. The parallel output from pulse shaper and bias circuit 90 to the reset input of set-reset trigger 120 is of no consequence in this operation and thus may be disregarded.

Figure 4:
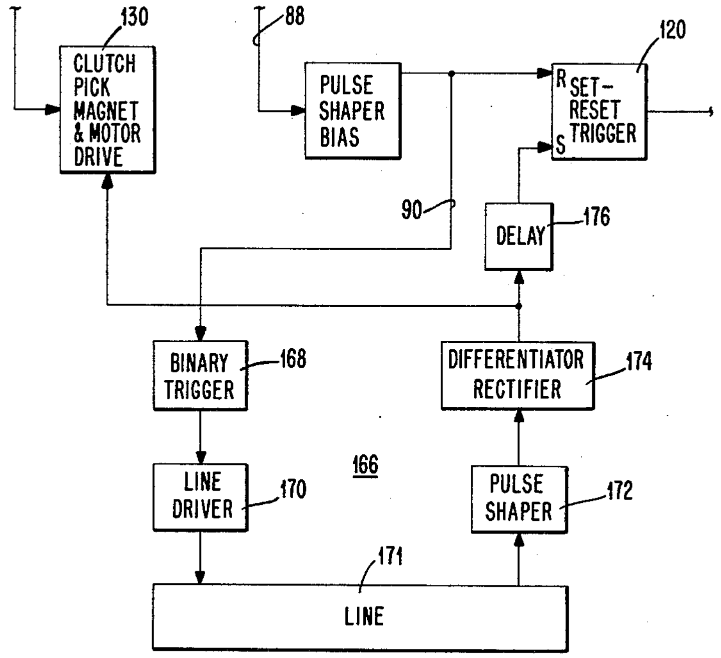
FIGURE 4 shows a modification of the circuit of FIGURE 1 to form a circuit for serializing and deserializing data.

It is to be observed that the system 10 with slight modification to form the system 166 as shown in FIGURE 4, may serve as a serializer-deserializer system irrespective of whether the serial information is received from or applied to a magnetic tape by means of the magnetic head. As such a serializer-deserializer apparatus, the system would receive parallel data by the selective closure of switches 62–68, in the manner as explained hereinabove and the serial data would be produced along line 88 to pulse shaper and bias circuit 90 and from this circuit directly to a binary trigger 168. The trigger 168 is of a known type having a pair of states of stable equilibrium and being responsive to successive input pulses to change states. In each state a different value of output potential is produced at this trigger. A line driver circuit 170 of a known type is interposed between the output of trigger 168 and the transmission line 171 to which the serial data is delivered.

Conversely, serial data received by the system 166 from a transmission line is applied to a pulse shaper circuit 172 and from the output of this circuit to a differentiator-rectifier circuit 174. These circuits may be of a known type and effective together to produce relatively sharp and clearly defined pulses which are applied to clutch pick magnet circuit 130 and in parallel to a delay circuit 176. The delay circuit 176 is controlled so that it introduces a suitable delay that establishes the appropriate timing relationship which is required for the commutator pulses to reset the trigger at a point of time other than that in which the trigger is being set by the input pulses.

In the systems 10 and 166, the several component circuits shown in block form may be of any conventional type suitably interrelated or matched as to output and input with other systems components as may be determined by anyone skilled in this art. Thus, for simplicity and brevity and to facilitate an explanation of the features of this invention, a detailed description of typical embodiments of such component circuits is avoided.

While the invention has been particularly shown and described with reference to preferred embodiments thereof, it will be understood by those skilled in the art that various changes in form and details may be made therein without departing from the spirit and scope of the invention.

What is claimed is:

1. In combination, a transducer effective to produce an electrical signal in response to relative movement between said transducer and a magnetized portion of a magnetizable medium, means for producing a series of spaced electrical pulses, means for relating the production of said pulses to the movement of said transducer, a bistable trigger circuit having a pair of inputs and an output and being responsive to electrical pulses applied to respective of said inputs to assume different states of stable equilibrium in each of which a different output potential is produced in the energized condition thereof, means coupling the output of said pulse producing means to one input of said bistable trigger and the output of said transducer to the other input of said bistable trigger to cause pulses produced by said transducer to be effective to establish a first state of said bistable trigger and pulses from said pulse producing means to be effective to establish the other state of said bistable trigger, and means connecting the output of said bistable trigger circuit, at times consisting of times before said pulses are effective to switch said bistable trigger circuit, to means recognizing the state of said bistable trigger circuit as binary data.

2. In combination, a magnetic head for reading binary bits of information recorded on a magnetic tape by relative movement therebetween, means for reciprocally moving said head, means responsive to the positioning of said head for producing a series of electrical pulses during the movement of said head in one direction, a bistable trigger circuit capable of assuming two states of stable equilibrium in an energized condition thereof and having a different output potential in each of said states, said trigger circuit having a pair of inputs, said respective inputs being responsve to electrical pulses to effect a transition in the state of equilibrium of said trigger circuit, means coupling the output of said head to one input of said trigger circuit, means coupling said pulse producing means to the other input of said trigger circuit to cause the reading of binary one bits of information by said head at times between the production of the electrical pulses by said pulse producing means to be effective to establish a predetermined condition of said trigger circuit and said pulses from said pulse producing means to be effective to establish the other condition of said trigger circuit, and means connecting the output of said bistable trigger circuit, at times consisting of times before said pulses are effective to switch said bistable trigger circuit, to means recognizing the state of said bistable trigger circuit as binary data.

3. A circuit for selectively serializing and deserializing groups of electrical pulses comprising pulse producing means having a first output in series circuit with each of a plurality of other outputs, said pulse producing means being effective to produce a series of spaced pulses at its first output and a pulse displaced in time from said series of spaced pulses at a different one of its other outputs concurrent with each of said series of pulses, a plurality of AND circuits each having first and second inputs and an output, said AND circuits being responsive to an electrical impulse applied at the first input to pass an electrical output pulse at said first input and at its output in the electrically energized condition of its second input, means for selectively and individually energizing the second inputs of said AND circuits in accordance with parallel coded information and switch means for selectively and simultaneously energizing all of the second inputs of said AND circuits, means coupling the plurality of other outputs of said pulse producing means to respective first inputs of said AND circuits, a bistable trigger circuit having a pair of inputs and an output and being capable of assuming a pair of states of stable equilibrium in the energized condition thereof in each of which states a different output potential is produced, said trigger circuit being responsive to electrical pulses applied at its respective inputs to assume different ones of its states of stable equilibrium, means coupling said first output of said pulse producing means to one of the inputs of said bistable circuit, means for coupling a source of serially coded pulses representative of information to the other input of said bistable circuit, a second plurality of AND means capable of serving as an output, each having two inputs and an output, means connecting the output of said bistable circuit to the inputs of said second plurality of AND means, and means individually connecting the output of each of said first recited AND circuits to an input of each of said second plurality of AND means, means connecting the output of each said second plurality of AND circuits to means recognizing binary signals as binary data, a magnetic transducer, and means selectively connecting said first output of said pulse producing means to activate said magnetic transducer to record magnetic records.

4. In combination, a transducer effective to produce an electrical signal in response to relative movement between said transducer and a magnetized portion of a magnetizable medium, a bistable circuit capable of assuming two different stable states in the energized condition thereof and having a pair of inputs and an output, said bistable circuit being responsive to electrical signals applied at said respective inputs to produce different potentials at its output in its electrically energized condition, means for coupling the output of said transducer to one of the inputs of said bistable circuit, means for producing a first plurality of sequential electrical pulses, means for producing a second plurality of sequential electrical pulses occurring at times different from said first plurality of sequential electrical pulses, means for moving said transducer relative to a magnetizable surface for reading magnetically recorded information on said magnetizable surface, means for relating the relative movement of said transducer with the production of said first pulses and said second pulses, means for applying each of said second pulses to a first line, means for applying successive ones of the first pulses to respective other lines, means for coupling said first line to the other input of said bistable circuit, a plurality of AND circuits each having one input coupled to the output of said bistable circuit and each having an output, each of said AND circuits having a second input, means coupling the second input of respective ones of said AND circuits to respective ones of said other lines, and means connecting the output of each said AND circuit to means recognizing binary signals as binary data.

5. In combination, means for producing a first series of electrical pulses in timed spaced order, means for producing a second series of electrical pulses occurring at times different from said first series of electrical pulses, a bistable trigger circuit capable of assuming two states of stable equilibrium in the energized condition thereof, said trigger circuit having a pair of inputs and an output, the output of said trigger circuit being different in different states of equilibrium thereof, means responsve to an electrical pulse to initiate the production of said first series and said second series of pulses from said pulse means, means for coupling the output of said means for producing said first series of pulses to one input of said bistable trigger circuit, a delay circuit having an input and an output, the output being coupled to the other input of said bistable trigger circuit, means connecting the input of said delay circuit to said means responsive to an electrical pulse to initiate the production of said first series and said second series of pulses from said pulse means, a plurality of AND circuits having a pair of inputs, one input of each of said AND circuits being coupled to the output of said bistable trigger, means coupling the other inputs of said AND circuits to said means for producing a second series of pulses for sequentially applying pulses produced thereby to said AND circuits, means for conecting the input of said delay circuit to a source of electrical pulses, and means connecting the output of each said AND circuit to means recognizing binary signals as binary data.

6. In combination, a transducer, a record carrying discrete indications to which said transducer is sensitive to produce an output, means to produce first signals when said transducer is located between said discrete indications, a bistable device having an input and an output and capable of being responsive to a signal of one kind applied at the input to assume a first state and to a signal of another kind applied at the input to assume a second state, means coupling said means to produce first signals to the input of said bistable device to produce signals of said one kind, means coupling the output of said transducer to the input of said bistable device to produce signals of said other kind, and means connecting the output of said bistable device, at times consisting of times before said first signals are effective to switch said bistable device, to means recognizing the state of said bistable device as binary data.

7. The combination as in claim 6 wherein said record is a magnetized material.

8. In combination, a transducer, means to produce first signals when said transducer is in different positions relative to a reference position of said transducer, a bistable device having an input and an output and capable of being responsive to a signal of one kind applied at the input to assume a first state and to a signal of another kind applied at the input to assume a second state, means coupling said means to produce first signals to the input of said bistable device to produce signals of said one kind, means coupling the output of said transducer to the input of said bistable device to produce signals of said other kind, and means connecting the output of said bistable device, at times consisting of times before said first signals are effective to switch said bistable device, to means recognizing the state of said bistable device as binary data.

9. The combination as in claim 8 wherein said transducer is a device responsive to changes in magnetic flux.

10. In combination, a transducer effective to produce an electrical signal in response to relative movement between said transducer and a magnetized portion of a magnetizable medium, means for producing a series of spaced electrical pulses, means for relating the production of said pulses to the movement of said transducer, a bistable trigger circuit having a pair of inputs and an output and being responsive to electrical pulses applied to respective of said inputs to assume different states of stable equilibrium in each of which a different potential is produced in the energized condition thereof, means coupling the output of said pulse producing means to one input of said bistable trigger to provide an effective input on the trailing portion of pulses from said pulse producing means, and means coupling the output of said transducer to the other input of said bistable trigger so that pulses produced by said transducer are effective to establish a first state of said bistable trigger and trailing portions of pulses from said pulse producing means are effective to establish the other state of said bistable trigger, and means gated in response to the leading portion of pulses from said pulse producing means to read data from said bistable trigger to means recognizing binary signals as binary data.

References Cited by the Examiner

UNITED STATES PATENTS

| | | | |
|---|---|---|---|
| 2,430,379 | 11/47 | Wall | 315—218 |
| 2,903,605 | 9/59 | Barney et al. | 307—88.5 |
| 2,907,009 | 9/59 | Lesser | 340—174.1 |
| 2,986,725 | 5/61 | Dirks | 340—174.1 |
| 2,994,857 | 8/61 | Giel | 340—174.1 |
| 3,042,906 | 7/62 | Dirks | 340—174.1 |
| 3,049,698 | 8/62 | Thompson et al. | 340—174.1 |

IRVING L. SRAGOW, *Primary Examiner.*

BERNARD KONICK, *Examiner.*